United States Patent [19]

O'Meara et al.

[11] Patent Number: 5,090,795
[45] Date of Patent: Feb. 25, 1992

[54] INTEGRATED ADAPTIVE OPTICS APPARATUS

[75] Inventors: Thomas R. O'Meara, Malibu; George C. Valley, Los Angeles, both of Calif.

[73] Assignee: Hughes Aircraft Company, Los Angeles, Calif.

[21] Appl. No.: 440,393

[22] Filed: Nov. 10, 1989

Related U.S. Application Data

[60] Division of Ser. No. 118,707, Oct. 22, 1987, abandoned, which is a continuation-in-part of Ser. No. 865,231, May 20, 1986, abandoned.

[51] Int. Cl.$^5$ .............................................. H04N 9/31
[52] U.S. Cl. ................................... 359/240; 359/189; 359/241; 359/245
[58] Field of Search ................ 455/612, 619; 350/354, 350/356, 611, 353

[56] References Cited

U.S. PATENT DOCUMENTS

| | | |
|---|---|---|
| 3,552,824 | 1/1971 | Kiss . |
| 3,575,490 | 4/1971 | Reisman . |
| 3,967,899 | 7/1976 | O'Meara . |
| 3,975,628 | 8/1976 | Graves et al. ............... 455/619 |
| 4,013,345 | 3/1977 | Roach . |
| 4,156,852 | 5/1979 | Hagen . |
| 4,249,140 | 2/1981 | Freiberg . |
| 4,289,403 | 9/1981 | Allington . |
| 4,405,230 | 9/1983 | Tew et al. ................... 356/5 |
| 4,435,808 | 3/1984 | Javan . |
| 4,441,791 | 4/1984 | Hornbeck . |
| 4,443,066 | 4/1984 | Freyre . |
| 4,481,531 | 11/1984 | Warde et al. . |
| 4,540,244 | 9/1985 | Sincerbox . |
| 4,546,477 | 10/1985 | Richards . |
| 4,569,588 | 2/1986 | Nishiwaki et al. ............ 356/28.5 |
| 4,619,501 | 10/1986 | Armitage . |
| 4,643,533 | 2/1987 | Armitage . |
| 4,698,602 | 10/1987 | Armitage . |
| 4,893,353 | 1/1990 | Iwaoka et al. ............... 455/612 |

OTHER PUBLICATIONS

C. Warde et al, "High Resolution Adaptive Phase Compensation for Low-Visibility Optical Communication", IEEE Journal 1980, pp. 539-545, Eascon Conference Proceedings.

A. D. Fisher et al, "Technique for Real-Time High-Resolution Adaptive Phase Compensation", Optics Letters, Jul. 1983, vol. 8, No. 7, pp. 353-355.

J. H. Shapiro et al, "Optical Communication Through Low Visibility Weather", Optical Engineering, Jan.-/Feb. 1981, vol. 20, No. 1, pp. 76-83.

T. R. O'Meara et al., "Applications of Nonlinear Phase Conjugation In Compensated Active Imaging", Optical Engineering, Mar./Apr. 1982, vol. 21, No. 2, pp. 231-235.

H. J. Deuling, "Deformation of Nematic Liquid Crystals in an Electric Field", Molecular Crystals and Liquid Crystals, 1972, vol. 19, pp. 123-131.

O. V. Garibyan, "Optical Phase Conjungation by Microwatt Power of Reference Waves Via Liquid Crystal Light Valve", Optics Communications, vol. 38, No. 1, Jul. 1, 1981, pp. 67-70.

Primary Examiner—Mark Hellner
Attorney, Agent, or Firm—V. D. Duraiswamy; W. K. Denson-Low

[57] ABSTRACT

An integrated adaptive optics apparatus for processing wavefront errors. In a preferred embodiment, a modified liquid crystal light valve (LCLV) is used as an integrated wavefront sensing and wavefront control system. A remote reference aberrated wavefront 10, passed through the liquid crystal layer and reflected, is then fed-back in part to the rear surface of the liquid crystal light valve 12, after combination with a local reference plane wave 16. The resulting interference pattern is incident on the photosensitive layer 26 of the LCLV, causes commensurate index changes in the liquid crystal layer, and adapts the LCLV for performing aberration correction. In an alternative embodiment, a second laser beam 11 may be predistorted by passing it through the adapted liquid crystal layer in order to compensate in advance for atmospheric path disturbances. The present invention provides an adaptive optics correction system having high spatial resolution. Alternate embodiments for wavefront scrubbing and wavefront replication are also disclosed.

8 Claims, 11 Drawing Sheets

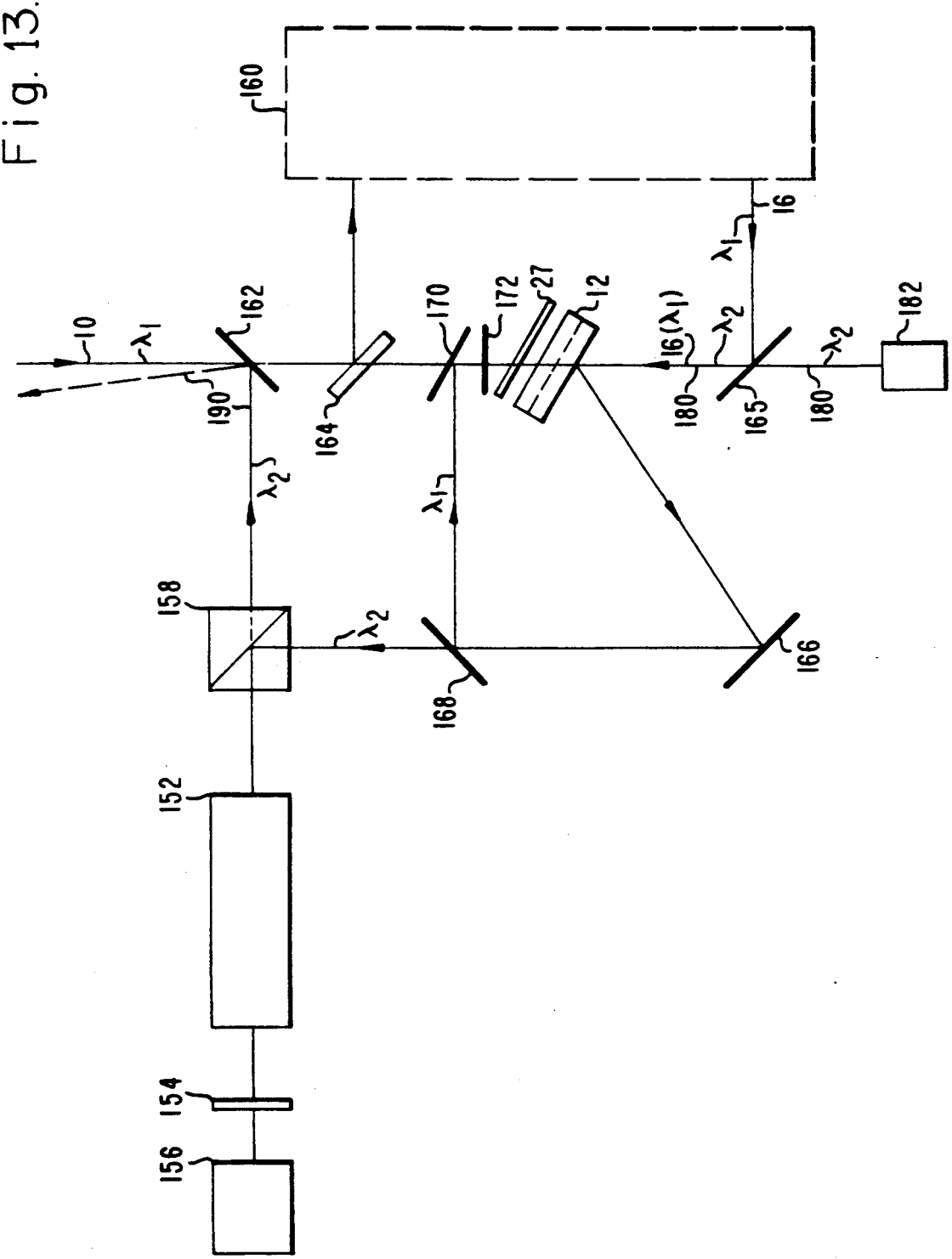

INTEGRATED ADAPTIVE OPTICS APPARATUS

STATEMENT AS TO GOVERNMENT RIGHTS

This invention was made with Government support under Contract No. F30602-83-C-0198 awarded by the Department of the Air Force. The Government has certain rights in this invention.

CROSS-REFERENCES TO RELATED APPLICATIONS

This is a division of application Ser. No. 118,707, filed Oct. 22, 1987, which was a CIP of Ser. No. 06/865,231, filed May 20, 1986, now abandoned.

BACKGROUND OF THE INVENTION

1. Field of the Invention

The present invention pertains in general to adaptive optics systems for correcting and preconditioning laser beams, and in particular, in one of the preferred embodiments, to the integration of wavefront sensor and correction functions into one integrated device.

2. Background Information

Since the invention of the laser in the 1950s, the optics industry has succeeded in vastly improving the power and utility of coherent light sources. The amount of radiant energy which can be transmitted over great distances with a minimum of scattering and diffraction losses has increased dramatically. In addition, a great number of applications have been developed for exploiting the spectral purity and spatial coherence of the laser beam. Communications, data transfer, and the projection and processing of images have come to depend upon the unique properties of the coherent laser wavefront. These properties must be preserved if the powerful and beneficial qualities of laser radiation are to be fully utilized. Except in free space, a laser beam travels through a material medium. When a laser beam propagates through glass, salt, quartz lens arrangements, optical fibers, or the atmosphere, the wavefront quality of the laser beam is often degraded. Waves with good spatial quality become aberrated when they traverse such inhomogeneous media; for example, a plane wave might emerge with a randomly perturbed wavefront. The enhanced diffraction which is associated with such aberrated waves significantly reduces the ability to focus the beam to a high-quality beamspot or to efficiently transmit a communications signal to a remote receiver.

Another problem occurs when such laser wavefronts are transmitting large amounts of energy. Some portion of that energy is absorbed when it passes through a given optics system of lenses, mirrors, and other optical devices, or travels through the atmosphere. When a material absorbs energy, it gets heated and typically the index of refraction of the material changes. This change in index varies across a given beam profile, since the intensity of the beam and consequently the amount of heat absorbed at any particular point in the material vary as a function of location within the beam. Differences in index cause diffraction and/or refraction of a laser beam which passes through material. The consequent spreading of the incident laser beam due to the laser-induced index differential is termed "thermal blooming". Thermal blooming can seriously degrade performance of a laser system designed to transmit an appreciable amount of energy over a long distance. Due to thermal blooming, the transmitted beam will have a phase distribution which is so randomized across its wavefront by the time it reaches the receiving site, that even a refocusing of the beam cannot eliminate the destructive interference which results within the beam. As a result of the destructive interference, the laser beam will deliver only a small fraction of the original transmitted energy to the receiving site.

Adaptive optics systems have been developed to reduce the deleterious effects of atmospheric turbulence, thermal blooming, and irregularities within the optical train. These systems combine wavefront sensing and wavefront correction within a closed feedback loop in order to correct wavefront errors in any transmitted laser beam. A typical laser beam direction system might work as follows. A laser beam from a laser source is directed via an atmospheric path to a target or receiving site. Because of optical path aberrations, such as turbulence and thermal blooming, only a portion of the radiation will reach the receiving site. In some systems, a laser reference signal is transmitted through the atmosphere and is used as a probe wave to sample the atmospheric aberrations. Alternatively, corner reflectors or target glints can be used to reflect incident laser radiation to achieve the same result. The wavefront of the reflected or reference signal suffers phase aberrations as it travels through the atmosphere. If these phase aberrations are then sensed, and the laser beam of interest is pre-distorted before transmission through the atmosphere, to exhibit this identical aberration, the aberrations will be almost exactly reversed or compensated-for as the laser beam travels through the atmosphere, and the laser beam will arrive at the target or receiving site unaberrated. Therefore, there will be practically no loss of beam energy due to atmospheric turbulence during transmission. The full amount of beam energy will therefore arrive within a diffraction-limited spot at the receiving site.

A variety of apparatus and methods have been developed or proposed to achieve this type of beam correction. Of these, the deformable mirror is perhaps the most popular and most easily understood. The deformable mirror is composed of a thin flexible glass, metallic sheet, or metallized membrane behind which is an array of piezoelectric or solenoid actuators. These actuators are push-pull devices which deform the mirror surface from its normal planar state. The reference signal traveling towards the laser source, strikes this deformable mirror, and is reflected through the adaptive optics system. The phase distribution of the aberrated wavefront is measured by any one of a number of standard techniques which are well known to those persons skilled in the art. This phase distribution is converted into electronic signals by a wavefront error sensor, and these electronic signals govern the voltages to be applied to each actuator. Then the actuators proportionately deform portions of the mirror. The system continuously adjusts front contour of the deformable mirror until the reference signal reflected by it has an unaberrated wavefront. After this happens, when the laser signal of interest is reflected by this deformed mirror, the reflected signal will be the time-reversed phase conjugate of the reference signal and will arrive at the receiving or target site almost completely unaberrated.

The deformable mirror has many inherent problems and drawbacks, some of which are discussed below. The use of discrete, bulky electrical actuators limits the spatial frequency response of the mirror. Moreover, a deformable mirror simply cannot correct errors finer than the spacing of the push-pull actuator elements. In addition, these actuators typically require several thousand volts for operation and are subject to arc-overs and permanent breakdowns. Another drawback is that the temporal frequency response of the adaptive system is limited by the impedance of the actuation device and the mass of the mirror. Each detector-actuator feedback loop requires discrete electronic processing systems. The thin front surface of the mirror continuously experiences flexures. These flexures and other variations in the system materials, including the bonding material, contribute to drift and creep problems which adversely affect performance.

In an attempt to improve upon the performance of the deformable mirror, other phase-conjugation approaches have been attempted. Nonlinear optical media, using stimulated Brillouin, Raman scattering or degenerate four-wave mixing, have been used to provide a time-reversed wave as an output in some applications. In these methods, the medium is pumped by one or more local laser beams and the electric field of the aberrated reference signal, upon entering the phase-conjugation cell, causes index variations within the nonlinear medium in exact correspondence to the interference pattern between the remote reference signal and the local pump beams. When an incident laser beam is reflected by this index grating, the phase of the reflected beam has a field which is nearly the conjugate of that of the incident beam, and the reflected beam reaches the receiving site with minimal aberrations.

Although this phase-conjugation method greatly improves the spatial resolution of the system (the "actuator spacing" is now limited by the size of the atoms or molecules comprising the nonlinear medium), it also suffers from serious problems. Since the input sensitivity is very low, a fairly large return signal is necessary in order to set up the proper index grating structure within the phase-conjugation cell. Power requirements make this method unsuitable for low-power optical communication and laser power transmission when the reference signal is very weak, as is typically the case. Thus, the low sensitivity and, in some instances, the low efficiency of conversion make phase conjugation an interesting but often impractical method for long-range adaptive optics applications.

None of the methods or devices described above provide an efficient and comprehensive solution to all of the problems of correcting the phase of an aberrated light wave. None of these devices provide a versatile, highly sensitive, compact, and simple apparatus for adaptively correcting coherent light wavefronts. Therefore, there is a need, felt by the optical community for over two decades, for a practical and reliable method and apparatus for precisely correcting the phase of a given light wave using adaptive optics. Utilization of such a device within a laser beam direction system would enable significant improvement in performance of the system in correction of atmosphere-created wavefront aberrations. Such an invention would be ideally suited for operation in cooperation with a wide variety of adaptive optics systems and would enhance the performance of any optical apparatus requiring high-resolution wavefront correction.

An all-optical phase compensation system was described by Cardinal Warde et al in "High Resolution Adaptive Phase Compensation for Low-Visibility Optical Communication", Proc. IEEE, vol. 68, pp. 539-545, (1980). In this article, the authors examine the system requirements dictated by the coherence parameters of low-visibility wavefronts and describe a class of all-optical systems being investigated for high resolution, real time, wavefront phase compensation. In the all-optical systems described therein, the optical output from an interferometric phase sensor is used to drive an optically addressed spatial phase modulator in the path of the received beam. Such systems are described therein as automatically performing phase compensation or phase conjugation without discrete electronic processing. A configuration illustrated and discussed in detail therein features an interferometer of the homodyne type and a microchannel spatial light modulator (MSLM). The MSLM is described by Warde et al as consisting essentially of a photocathode, a microchannel array plate, and an electro-optic plate with a high resistivity dielectric mirror on one side and a transparent conducting electrode on the other.

The present invention, as discussed in detail later, in a preferred embodiment, uses a modified liquid crystal light valve (LCLV) with a parallel-aligned bire-fringent liquid crystal layer to provide an integrated adaptive optics apparatus. The present inventive apparatus is capable of compensating for wavefront aberration with high spatial resolution, and capable of operating with error signals encoded on optical beams of low intensity, with minimal total operating power and low operating voltages, while being able to handle multiple discrete-channels, typically on the order of thousands, and sometimes as high as one million. Moreover, the present inventive modified LCLV integrated apparatus is operable in several different operational modes, namely wave conjugation, wave scrubbing and wave replication modes, thereby being useful for several different adaptive optics applications.

SUMMARY OF THE INVENTION

The present invention provides an effective, compact, simple device which enables the active correction of aberrated wavefronts with previously unattainable precision. This invention utilizes a modified type of liquid crystal light valve (LCLV). The resulting adaptive optics system combines both wavefront sensing and wavefront correction in a single versatile package.

If the liquid crystal element in a liquid crystal light valve (for example, U.S. Pat. No. 4,019,807, with either a CdS or Si photoconductor) is replaced with a parallel-aligned, tunable, birefringent liquid crystal substrate, the device can be used as a deformable mirror. Unlike the conventional deformable mirror device, the LCLV device does not require signal processing, electrical amplification, or high voltage sources. Moreover, it offers a spatial resolution of approximately thirty microns per pixel, whereas by contrast, a typical deformable mirror might only have 16 to 60 pixels spread over an area of 100 square centimeters. An added advantage is that, since the present invention requires very little power and low voltages to produce the desired phase modulation effects, it can be used to great advantage in very compact image and data processing systems. Moreover, the rather uniform wavelength dependence of the phase shifts created in the liquid crystal mirror allow the device to handle multiple wavelengths, just as in conventional deformable mirror technology.

The present invention provides an apparatus which combines the capabilities for wavefront sensing, signal processing, and wavefront correction within one integrated device useful for adaptive optics applications.

The invention provides an adaptive optics wavefront correction system capable of compensating for wavefront aberration with high spatial resolution compensation capability.

Still another purpose of the invention is providing an adaptive optics system capable of operating with error signals encoded on optical beams of low intensity, making possible simplified wavefront correction systems for data and image transferral systems.

Further, the invention provides a high-gain coherent wavefront replicator with near-quantum-limited noise performance.

Yet another purpose of the invention is provision of a wavefront correction system capable of combining the outputs of multiple low-power lasers with random phasing into a single high power coherent beam.

The invention provides a single-pass adaptive optics system capable of sensing and correcting phase errors in an incident wavefront as the wavefront passes once through the aberration-producing media.

Still another purpose of the invention is provision of a wavefront sensing and correction system requiring only minimal total operating power and low operating voltages.

Another purpose of the invention is that it provides an adaptive optics system capable of sensing and correcting atmospheric and optical system aberrations at one wavelength of light while simultaneously reflecting and correcting aberrations in light from another source at a different wavelength.

Still another purpose of the integrated apparatus of the invention is to reduce the cost, size, and weight of adaptive optics systems. This makes possible various space-borne applications which were previously impractical.

Yet another purpose of the invention is the elimination of the need for costly, bulky, and time-consuming data processing and signal amplification in adaptive optics systems.

These and other features, purposes and advantages of the present invention will become more fully apparent from the following description of a preferred embodiment taken in conjunction with the accompanying drawings.

BRIEF DESCRIPTION OF THE DRAWINGS

FIG. 5a shows the liquid crystal layer without any change in applied voltage. FIG. 5b shows the liquid crystal layer after the voltage changes in a portion of the layer and the consequent correction of an incident aberrated wavefront.

FIG. 13 is a schematic diagram of an alternative embodiment of the present invention operable as a wavefront replicator.

DETAILED DESCRIPTION OF PREFERRED EMBODIMENTS

Figure 1:
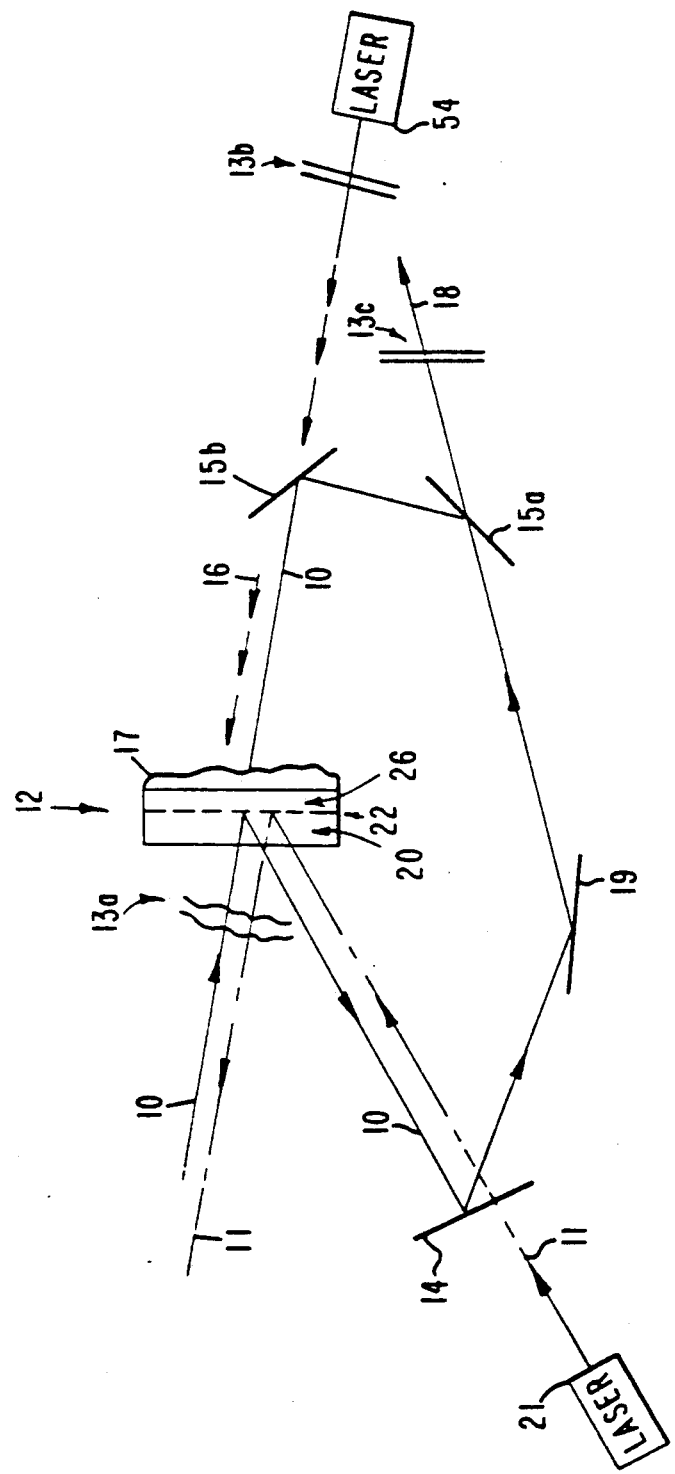
FIG. 1 is a schematic view of the liquid crystal light valve adaptive optics system incorporating a modified liquid crystal light valve. Illustrated are a series of beamsplitters and ray traces of the remote reference, local reference, and reflected wavefronts.

FIG. 1 is a schematic diagram of an adaptive optics system utilizing a liquid crystal light valve (LCLV) 12 to correct phase errors in incoming coherent wavefronts. A nonaberrated wave may be represented by the plane wavefronts depicted in FIG. 2. They are shown propagating in the x direction. At any point along the x axis, the wavefront 44 has a constant phase in the y direction: i.e., the phase of the wave is a constant along the wavefront. An aberrated wave, however, has wavefronts which resemble those shown in FIG. 3. The purpose of any adaptive optics system is to restore the aberrated wavefront 46 of FIG. 3 to an approximately plane wavefront 44 as in FIG. 2.

Figure 4:
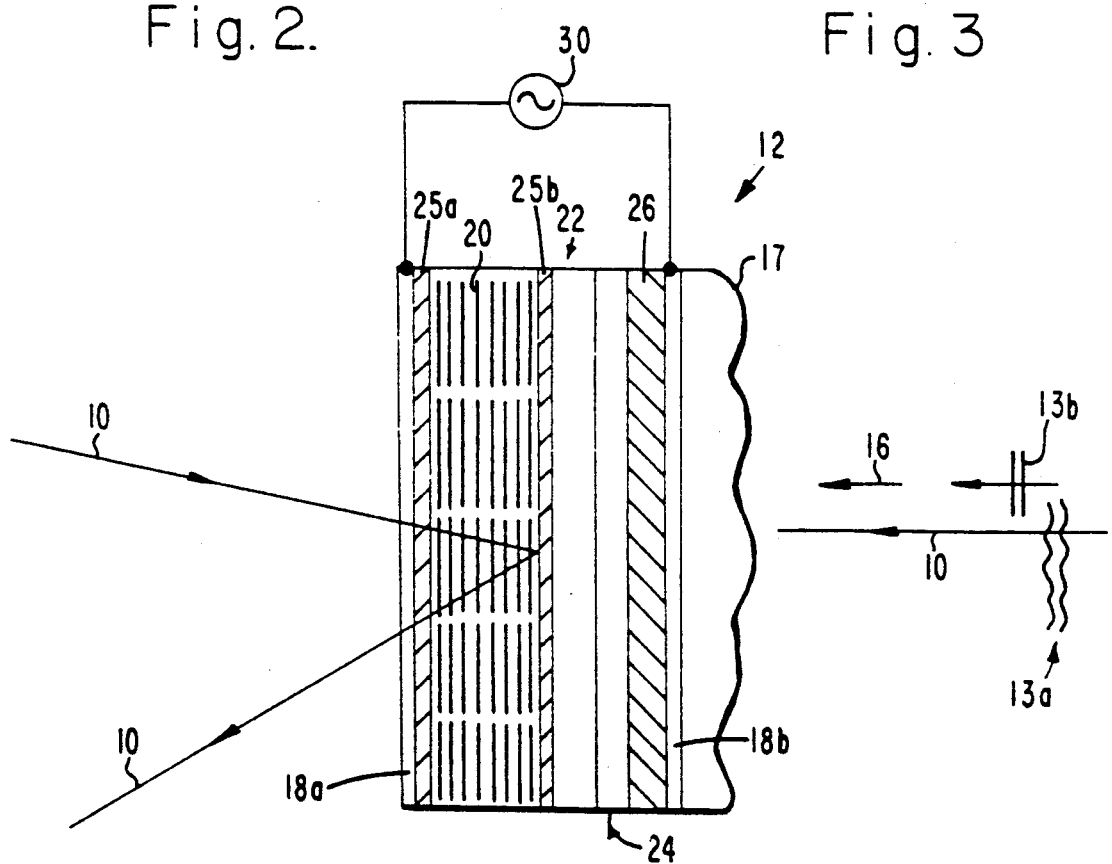
FIG. 4 illustrates the composition of the particular modified liquid crystal light valve used in the preferred embodiment of the invention.
Figure 9:
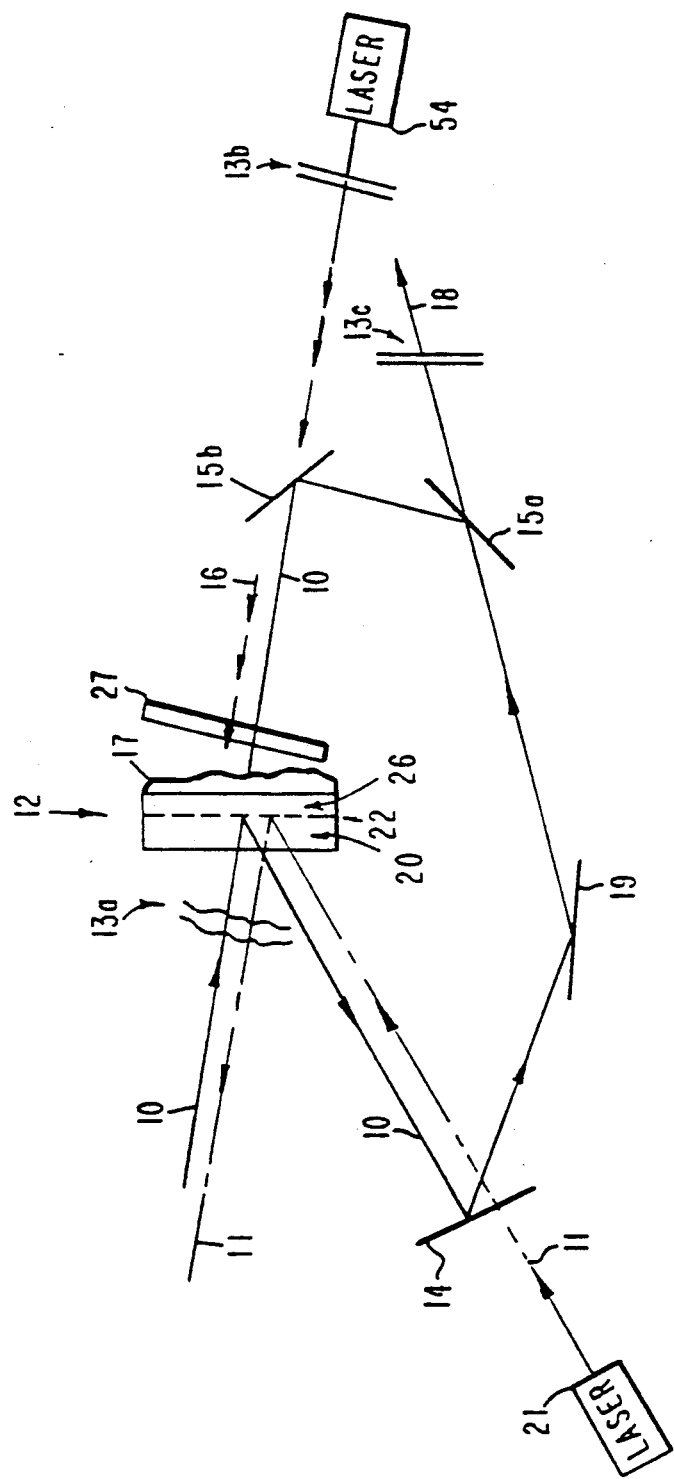
FIG. 9 shows a microchannel image preamplifier added to the apparatus described in FIG. 1 in order to boost the signal strength of the interference pattern and, where required, to decrease somewhat the resolving power of the adaptive optics system.

Referring to FIGS. 4 and 9, remote reference beam 10, indicated by wavefronts 13a which represent the aberrated wavefronts in need of correction, is incident on the LCLV 12. The terms "beam" and "wavefront" are herein used interchangeably in referring to the remote and local references. The remote reference wavefront 10, after passing through liquid crystal layer 20, is reflected by an internal dielectric mirror 22, and passes through the liquid crystal 20 again. The remote reference wavefront 10 is then reflected by an aperture-sharing component (or beamsplitter) 14, reflective element 19, and beamsplitters 15a,b and is combined with a local reference plane wave 16 at the rear of the LCLV 12.

Figure 2:
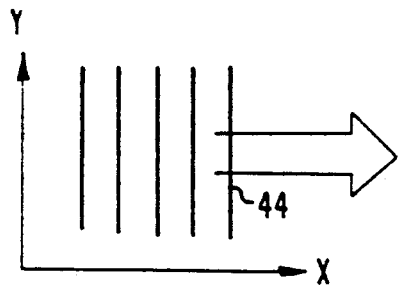
FIG. 2 is a cross-sectional view of plane wavefronts traveling in the x-direction.
Figure 3:
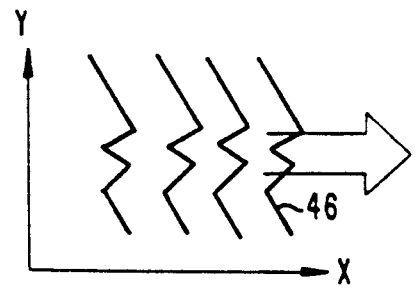
FIG. 3 is a cross-sectional view of aberrated wavefronts traveling in the x-direction.

The local reference plane wave 16, whose wavefront, indicated by 13b, is analogous to the plane wave patterns shown in FIG. 2, interferes with the remote reference wavefront 10 creating the characteristic light and dark patterns of interfering light. Local laser oscillator 54 provides the local reference plane wavefront 16 with the same wavelength as the remote reference wavefront 10. When both wavefronts are in phase, i.e., when the remote reference wavefront 10 approximates a corrected plane wave, constructive interference, or a bright spot, results. Where the two wavefronts are out of phase, i.e., when the remote reference beam 10 is aberrated with respect to a perfect plane wave, destructive interference, or a dark region, occurs. The resulting interference pattern 17 of light and dark areas, which is a "map" of the residual phase error of the reflected remote reference light, illuminates the photoconductive side 26 of the LCLV 12. As explained further on, the inherent feedback of the LCLV 12 drives this phase error towards zero, at which point the aberrations in the incoming wavefront are well-corrected upon reflection by the LCLV. This corrected wavefront 18 may exit through beamsplitter 15a and is illustrated by wavefronts 13c.

FIG. 4 illustrates an LCLV suitable for this adaptive optics application. The liquid crystal layer 20 must be composed of parallel aligned birefringent molecules which do not induce any polarizing effects upon the reflected wavefront. The standard liquid crystal light valve, Hughes Model H-4060, uses nematic liquid crystals which are twisted. Hence, the crystals polarize incident light in various ways which are undesirable for the present invention. The present invention uses the electroptic birefringence of the parallel-aligned liquid crystal layer. Indeed, any medium capable of altering its refractive index with applied voltage without inducing any further polarizing or amplitude modulation effects in incident radiation can be used for the present purpose. Without an applied electric field, the liquid crystal alignment layers 25a, b force all the liquid crystal molecules to remain parallel and present a constant index of refraction throughout the layer to any incoming wavefront. If an electric field is applied to a segment of the liquid crystal layer 20, the molecules of that segment rotate and the index of refraction for that segment of the liquid crystal device changes.

Aberrated light from the remote reference, degraded by distortions created during its travel path, passes through the liquid crystal layer 20, is reflected by a dielectric mirror 22, again passes through the liquid crystal layer, and is transferred by various optical means to the rear side of the LCLV where it is combined with a locally generated unaberrated plane wavefront 16. The combined wavefronts create an interference pattern 17 (conceptually illustrated by a wavy line in FIG. 4). Interference pattern 17 is carefully aligned to be in exact registration with the wavefront 10 from the target which is incident on the other side of the liquid crystal light valve. A photoconductive or photodetecting layer 26 lies sandwiched behind the dielectric mirror 22, both layers 20 and 26 being pressed between two clear conductive electrode layers. The liquid crystal layer side of the LCLV 12 will hereinafter be referred to as the front side of LCLV 12. The photoconductor side of LCLV 12 will hereinafter be referred to as the back or rear side of the LCLV 12. When a voltage is applied across these conductors, any change in resistance of the photoconductor due to absorbed radiant energy causes a proportionate change in voltage across the liquid crystal element at that point. The interference pattern 17, which represents a spatial mapping of the wavefront errors of the incoming target radiation, is such a source of radiant energy. Therefore, when the interference pattern 17 is incident on the photoconductive layer, voltages across the liquid crystal element will change at precisely those points where the wavefront of the target radiation is aberrated. The refractive index and hence optical path length of the liquid crystals will change at those points due to changes in the applied field. These liquid crystal molecules act as microscopic phase-shifting elements which "push or pull" the incoming wavefront until a nearly uniform interference pattern is obtained upon the photoconductive side of the LCLV, at which point the system is in steady-state equilibrium.

When the interference pattern 17 is nearly uniform and in steady-state, the incoming wavefront is completely corrected upon reflection, and the liquid crystal "mirror" can be used to reflect a preaberrated laser beam so that it arrives at a desired receiving site completely unaberrated.

Since the remote reference wavefront 10 passes through the front surface transparent electrode 28a, and through the liquid crystal 20 and then is reflected by a dielectric mirror 22, it passes through the same segment of the liquid crystal layer twice. This is herein referred to as "reflection by the LCLV 12". If the index of refraction for that segment of the liquid crystal device is changed due to an applied electric field, then the wavefront at that point will experience a proportionate phase delay or advance, and this can be expressed as an effective change in the optical path length. Therefore the wave will be retarded or accelerated to some extent, and the phase of the wave at that point will be ultimately changed so as to reduce the phase errors.

Figure 5A:
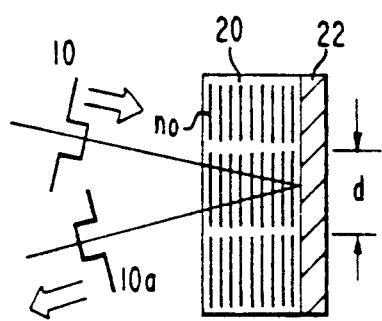
FIGS. 5a and 5b show the operation of the liquid crystal layer of the liquid crystal light valve as it corrects spatial phase distortion in an incoming remote reference wavefront.
Figure 5B:
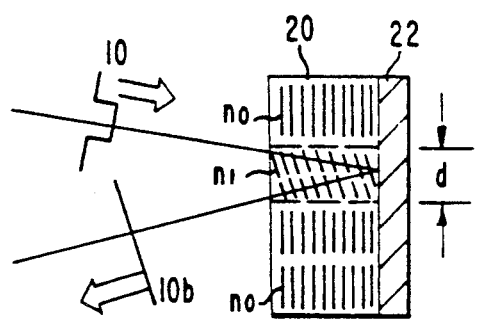

FIG. 5 demonstrates how this index alteration corrects wavefront errors. FIG. 5a illustrates a liquid crystal device with a remote reference wavefront passing through the liquid crystal 20, being reflected by the dielectric mirror 22, passing once more through the liquid crystal, and emerging as the output wavefront 10a. The remote reference wavefront 10 has an aberration shown in FIGS. 5a and 5b as a notch. The liquid crystal has a quiescent, i.e., unrotated, index $n_o$ throughout its breadth and the reflected wavefront 10a exactly matches the input wavefront 10; no wavefront correction has occurred.

When a voltage is applied across a portion of the liquid crystal (the mechanism for this voltage application is explained further on) denoted by dimension d, the index of refraction for that portion increases to $n_1$, due to the rotation of the birefringent liquid crystals. Therefore the optical path length for that segment of the liquid crystal also increases, thus retarding any wavefront passing through that segment. When the index changes by the desired amount, the notch of remote reference wavefront 10, after reflection back through the liquid crystal layer, will be pulled back in-line with the remainder of the wavefront 10b. At that point, the original wavefront 10 is corrected by the layer.

To use these unique properties of birefringent liquid crystals for the correction of wavefronts, implementation in general, and the proper application of voltages across the breadth of the liquid crystal element in particular, is accomplished by the remaining elements of the LCLV 12. Referring again to FIG. 4, after the remote reference wavefront 10 passes through the liquid crystal layer 20 and is reflected by the dielectric mirror 22, and is combined with the local reference wavefront 16 at the rear of the LCLV 12, the resulting interference pattern 17 is transferred through the rear transparent electrode 18b, and imaged onto the photoconductive substrate 26. This imaged pattern must have exact registration with respect to the remote reference wavefront 10 impinging upon the front side of the LCLV valve in order for proper wavefront correction to occur.

A voltage source 30 connected to the two transparent electrodes 18a and 18b places a potential drop across the combination of liquid crystal layer 20 and photoconductive substrate 26. This voltage should preferably be on the order of 6 Volts and 10 KHz in frequency for a cadmium sulfide photoconductor. The operation of the photoconductor heterojunction with such an ac voltage supply is taught in other related liquid crystal light valve patents, such as "Reflective Liquid Crystal Light Valve With Hybrid Field Effect Mode," Boswell et al., U.S. Pat. No. 4,019,807 assigned to the assignee of the present invention. For the purposes of the present invention, a silicon LCLV, modified as discussed earlier can also be used. Silicon liquid crystal light valves are discussed for example in "The Silicon Liquid-Crystal Light Valve", by U. Efron et al, J. Appl. Phys., Vol 57(4), Feb. 1985, pp. 1356-1368 and "Silicon Liquid Crystal Light Valves: Status and Issues", Efron et al, Optical Engineering, Vol. 22(b), Nov. 1983, pp. 682-686. A light-blocking layer 24 separates the liquid crystal portion 20 from the photoconductive portion 26, thus preventing the remote reference wavefront 10 from reaching the photoconducting substrate 26. When light from the interference pattern 17 strikes the photoconductive substrate 26, the intensity pattern liberates photoelectrons, causing a small current to flow. This results in a voltage change across the liquid crystal layer 20. This voltage change, which will be proportional to the brightness of the interference pattern 17, generates a commensurate index change in the liquid crystal layer 20.

Summarizing the process and referring to FIG. 1, any wavefront error in the portion of the remote reference wavefront 10, which is fed-back to the rear side of LCLV 12 interferes with the perfect plane wave of the local reference 16, and produces an interference pattern 17 upon the photoconductor 26. The intensity variations of the interference pattern 17 represent an approximate map of the wavefront errors in the remote reference wavefront 10 incident on the front side of the LCLV 12. The current created by the intensity variations of the optical interference pattern 17 changes the voltage across the liquid crystal layer 20 in the segments directly behind the location of these variations. The electrically-induced rotation of the liquid crystal molecules alters their index of refraction proportionately, until the aberrations in the incident wavefront are removed. By using such negative feedback, the LCLV 12 drives any wavefront error in the reflected remote reference wavefront towards zero. The resulting output wavefront 18 which emerges through beamsplitter 15a, is corrected for wavefront phase errors. Once the LCLV 12 has responded to the received remote reference wavefront 10 and has altered the orientation of the liquid crystal molecules to compensate for any wavefront phase errors, the liquid crystal layer 20 can function like a deformable mirror in an adaptive optics system.

In some applications, the production of the corrected wavefront 18 is the sole desired result. In other applications, a second conjugate wavefront must be generated using a higher-power beam which propagates over the same atmospheric path as the remote reference wavefront 10.

Referring again to FIG. 1, the second light wavefront 11, often a higher-energy laser beam, can be directed through the aperture-sharing component 14 and reflected by the liquid crystal layer 20 in a direction opposite to the incoming remote reference wavefront 10. This higher energy laser beam will acquire all the phase information patterned within the liquid crystal layer, and becomes predistorted in a time-reversed phase-conjugate sense. "Time-reversed phase-conjugation" signifies that the reflected wavefront exactly resembles the incoming wavefront, except that it travels in a direction opposite to the incoming wavefront. The predistorted beam 11 traverses all the atmospheric and other system aberrations to arrive at the desired target or receiving site as a perfect wavefront. The liquid crystal light valve is a simple, compact integrated device which combines the multiple wavelength utility of reflective deformable mirrors with the extraordinarily high resolution of phase-conjugation cells without many of their disadvantages.

Efficient operation of the above LCLV adaptive optics system requires certain further refinements. The phase as well as the frequency of the source 54 of the local reference wavefront 16 must be such that the desired relationship relative to the remote reference wavefront 10 is maintained. Additionally, the optical transfer relay system made up of those components which guide the remote reference wavefront 10 in a negative feedback loop around the LCLV 12 to be combined with the local reference wavefront 16, must fulfill certain critical requirements for the device to function satisfactorily.

Figure 6:
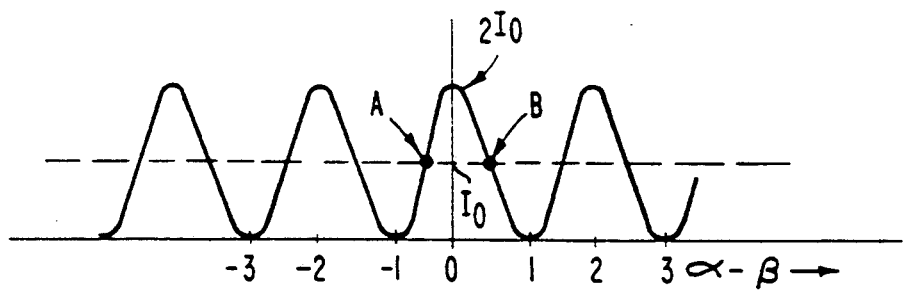
FIG. 6 is a plot of the amplitude of the interference pattern between a remote reference wavefront and a local reference wavefront. The mean intensity is plotted as a function of the phase difference between the two wavefronts.

In order to maximize the sensitivity of the present invention to small phase errors in the remote reference wavefront 10, the phase of the local reference plane wave 16 should be offset by $\pi/2$ radians from the mean phase of the remote reference wavefront 10 reflected from the front of the LCLV 12. FIG. 6 illustrates this requirement. If at any point x, the electric field $U_{rr}$ of the remote reference wavefront 10 is described by:

$$U_{rr} = U_o exp[i\alpha(x)]$$

where $U_o$ is the amplitude and $\alpha(x)$ is the phase, and the local plane wave reference field $U_{lr}$ is given by:

$$U_{lr} = U_o exp[i\beta];$$

then, the composite intensity of the interference pattern 17 varies according to $$I = I_o[1 + cos(\alpha - \beta)],$$

where $I_o = 2U_o^2$. This is illustrated in FIG. 6. If there is no reference offset, the system will function around $\alpha - \beta = 0$ with no sensitivity to small wavefront errors $\alpha$. However, a reference offset of $\pm \pi/2$ shifts the operation of the system to either point A or point B, depending upon whether the loop gain for the phase-shifting system is negative or positive. In the preferred embodiment, the overall system feedback is negative. Under these operating conditions, the system has maximum sensitivity to small relative phase shifts between the remote reference 10 and local reference 16 wavefronts, and hence optimum signal-to-noise performance.

Figure 7:
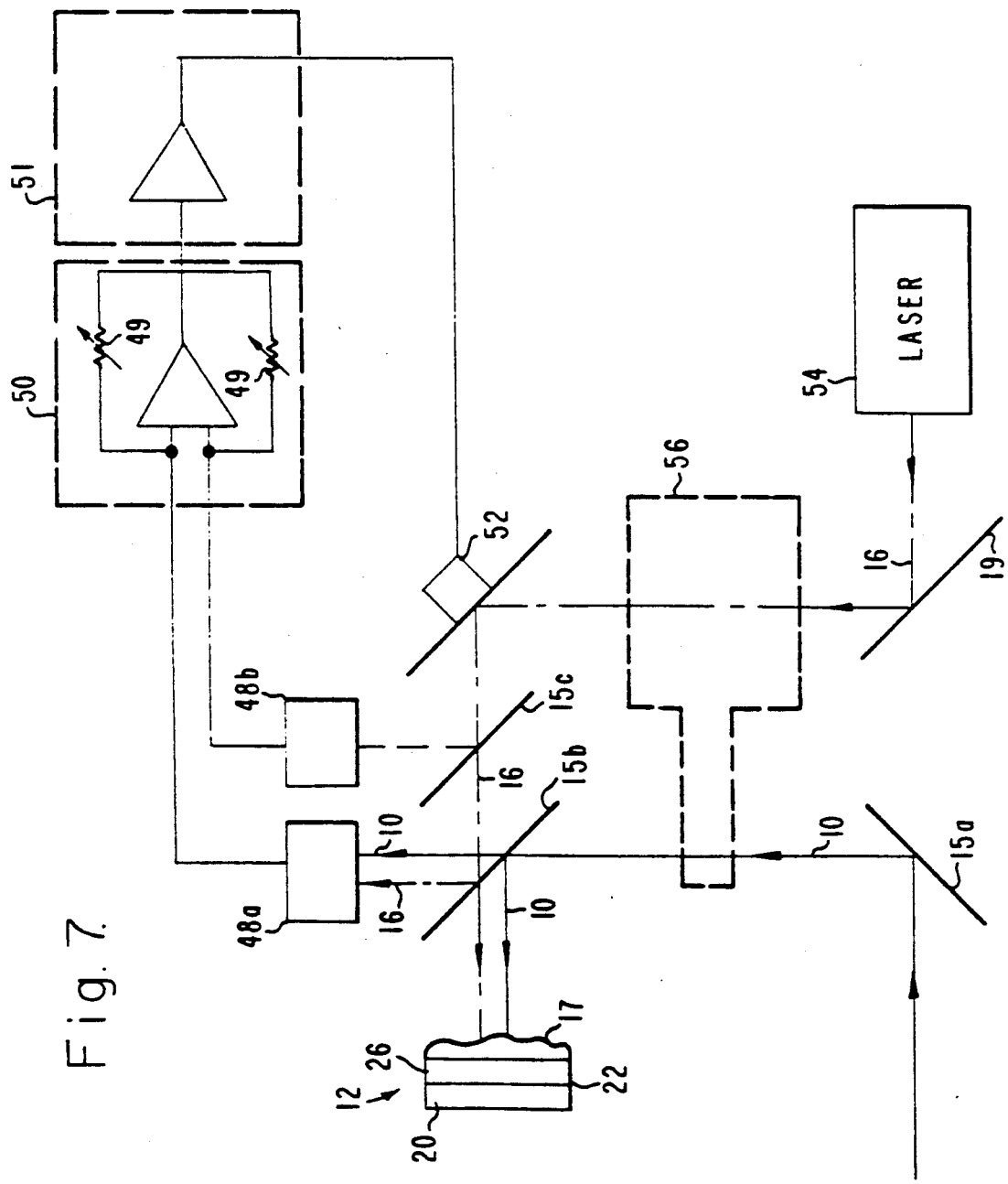
FIG. 7 is a schematic diagram of auxiliary apparatus added to FIG. 1 for maintaining the relative phase between the local reference wavefront and the incoming remote reference wavefront.

FIG. 7 shows an approach for maintaining such a local reference phase shift. Two detectors 48a and 48b are employed. For visible wavelengths, these detectors can be standard p-i-n detectors, with a lens to capture the entire beam intensity and focus it on the detector. The voltage of such a detector is proportional to the light intensity passing through the pin-hole. Alternately, the detector may be a silicon avalanche photodiode. One detector 48a measures the characteristic interference between the remote reference 10 and the local reference 16 wavefronts. The second detector 48b measures just the strength of the local reference wavefront 16. The differential operational amplifier (Op-Amp) 50 used conventionally with adjustable resistors 49, provides a difference signal from these two detectors which, amplified by a PZT amplifier 51 such as a Burleigh Model PA-70, drives a piezoelectric mirror 52. Since the difference signal exhibits a null precisely at the desired operating points ($\pi/2$ radians offset) shown in FIG. 6, the local piezoelectric servo 52 will drive the system to a lock point at either point A or B in FIG. 6, depending upon the sign of the feedback gain. At that point, the local reference plane wavefront 16 will be exactly $\pi/2$ radians out of phase with the mean phase of the remote reference wavefront 10.

In order to accurately control the relative phase between local and remote references using the feedback apparatus described above, the frequency differences between the two waves must first be held to low values. In FIG. 7, block 56 represents a frequency tracking unit used to accomplish this. Block 56 is shown in greater detail in FIG. 8.

Figure 8:
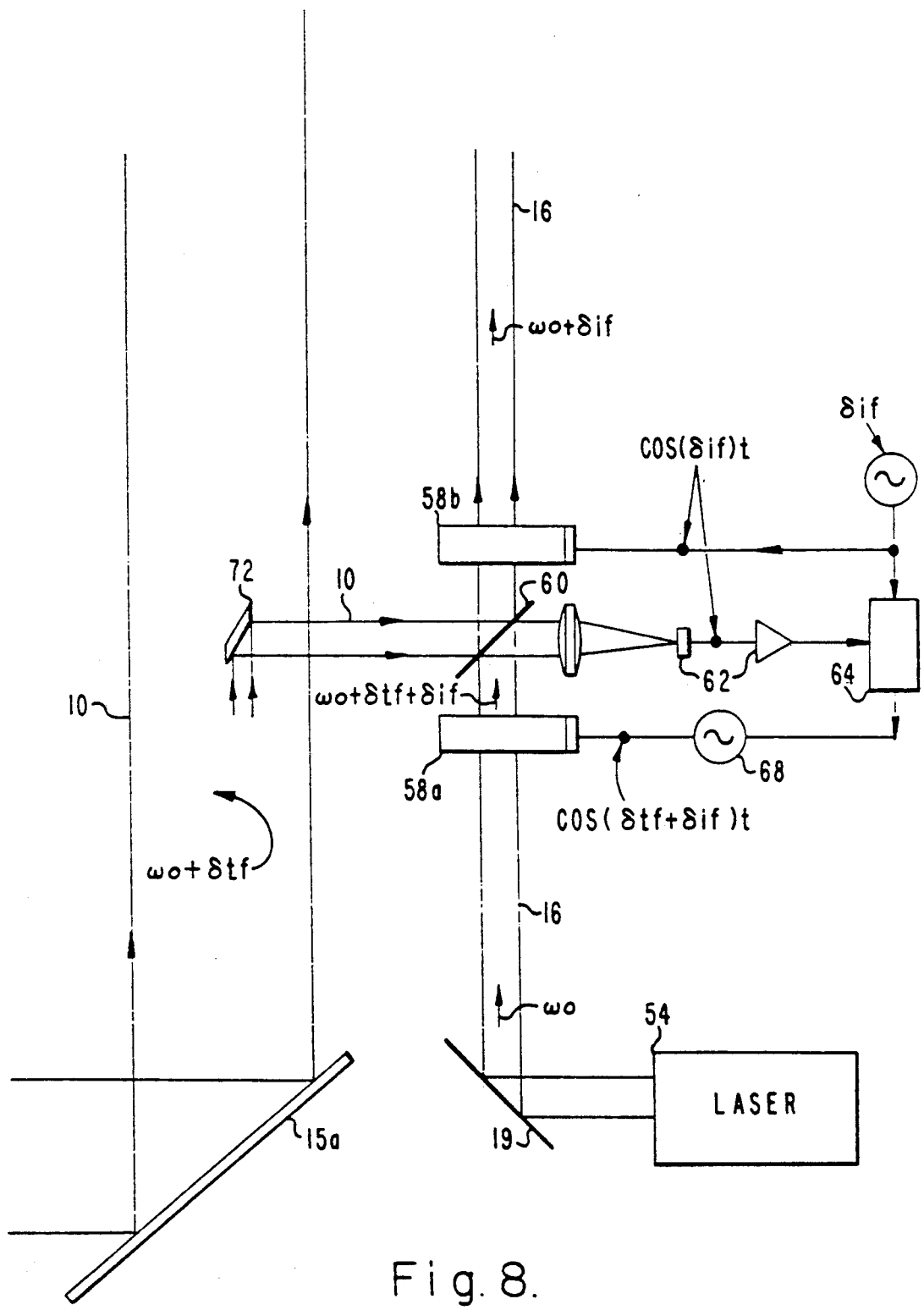
FIG. 8 schematically depicts apparatus to be added to systems of FIG. 1 and FIG. 7 to sample and compare a part of the incident remote reference with the frequency of the local reference in a optical phase-locked loop, allowing the local reference laser to track frequency drifts in the incoming remote reference beam.

Referring now to FIG. 8, a local laser oscillator source 54 provides the reference plane wave 16. The local reference wavefront 16 is reflected by reflector 19 and enters a Bragg cell 58a. Bragg cells, available commercially, use electroptic material, often tellurium dioxide. An applied voltage induces acoustic waves within the cell which, by modulating the index of refraction, can cause frequency shifts in light waves passing through the substrate. In this embodiment, the cell shifts the local laser oscillator 54 frequency to track the remote reference wavefront 10 sample reflected by the small mirror 72. The remote reference frequency will have frequency drift and Doppler shifts. By combining the sample of the remote reference wavefront beam 10 and the frequency-shifted local reference 16a using beamsplitter 60, a heterodyne detector 62 can determine the frequency difference $\delta_{tf}$ between the two. A heterodyne detector is simply a p-i-n or silicon avalanche photo-diode, but in this application, the amplitude of its output will be modulated by the frequency beating from the combined local 16 and remote 10 references. The signal from the heterodyne detector, combined, using a conventional lock-in amplifier 64, with a local oscillator source 66 tuned to an intermediate frequency described below, provides an output voltage which drives the voltage-controlled oscillator 68. This oscillator uses the Bragg cell 58a to shift the frequency $\omega_o$ of the local laser 54 by this frequency difference $\delta_{tf}$. The negative feedback of the loop maintains the local laser frequency at that of the remote reference.

However, to improve frequency tracking and to avoid $1/f$ noise in the post-detector electronics, the phase-locked loop tracks at an intermediate constant frequency offset provided by oscillator 66. Added to the signal from the heterodyne detector 62, it shifts the local laser frequency $\omega_o$ by the intermediate frequency $\delta_{if}$. The second Bragg cell 58b shifts the local reference frequency in the opposite direction by removing the intermediate frequency offset $\delta_{if}$, but not the tracking frequency offset $\delta_{tf}$. Thus, the local laser reference leaves the phase-locked loop at a frequency equal to $\omega_o + \delta_{tf}$ and tracks the remote reference 10 despite phase and frequency shifts which are not common to the two oscillators. Furthermore, because of the rapid frequency shifts available in Bragg cells, this phase-locked-loop (PLL) system 56 of FIG. 8 can track very rapid changes in either local or remote laser oscillator frequencies.

In addition to satisfying these phase-relation and frequency matching requirements, the LCLV adaptive optics system must also satisfy certain optical requirements in order to operate efficiently. First, as shown in FIG. 1, the remote reference wavefront 10 must impinge on the front side of the LCLV 12 slightly off-axis, both to permit efficient extraction of the remote reference wavefront 10 after it strikes the liquid crystal layer 20 and also to allow efficient injection of a second laser wavelength 11 in many dual-wavelength applications.

As a further requirement, the beam incident upon the backside of the LCLV 12, that is, the interference pattern 17 produced by wavefronts 10 and 16, must be in accurate registration with the wavefront 10 incident on the front side. More precisely, the charge pattern and the electric field applied to the liquid crystal layer must be in exact spatial registration with the front-side, remote reference phase pattern 10 which produced them. Thus the back-side beam comprising the interfering remote 10 and local 16 reference wavefronts must have the same angle of incidence with respect to the photoconductor as the front-side beam 10, just as illustrated in FIG. 1. Otherwise, projective misregistrations may occur.

As a further requirement, the optical relay system which feeds the incident remote reference wavefront 10 from the front to the back of the LCLV 12 must not invert the image in the plane of the relay system. In other words, an even number of reflective surfaces is required. One possible embodiment of such a system of reflective elements is shown in FIG. 1. This embodiment also satisfies the requirement that beams incident on both sides of the LCLV 12 should have the same angles of incidence.

Yet another requirement, shared in common by all adaptive optics systems, is that the relay fidelity must be commensurate with the basic spatial compensation capability of the system. The relay fidelity is usually described in conventional discrete channel adaptive optics systems in terms of the number of correction elements. For the LCLV adaptive optics system this number can be quite high, well over one million elements. Such a large number of channels challenges the resolution and fidelity capabilities of a given system. In most applications the full (million element) potential of the system is not required and in other applications the strength of the remote reference wavefront 10 may not be sufficient to sustain reasonable signal-to-noise ratios in the face of a minimal per-element photon count associated with such a large number of elements. One solution in either of the above cases is to degrade the effective resolution of the LCLV 12 and its associated elements. One method of resolution degradation, shown in FIG. 9, is to insert a microchannel plate preamplifier 27 (one such apparatus is manufactured by Galileo Electro-Optics Corporation in Sturbridge, Mass.) into the system just before the photoconductor 26. This preamplifier comprises a bundle of fiberoptic light amplification channels. The fiber diameter of the particular preamplifier chosen determines the new spatial resolution capability of the system. Moreover, the preamplifier will generally be needed when working with very distant remote reference 10 sources.

Figure 10:
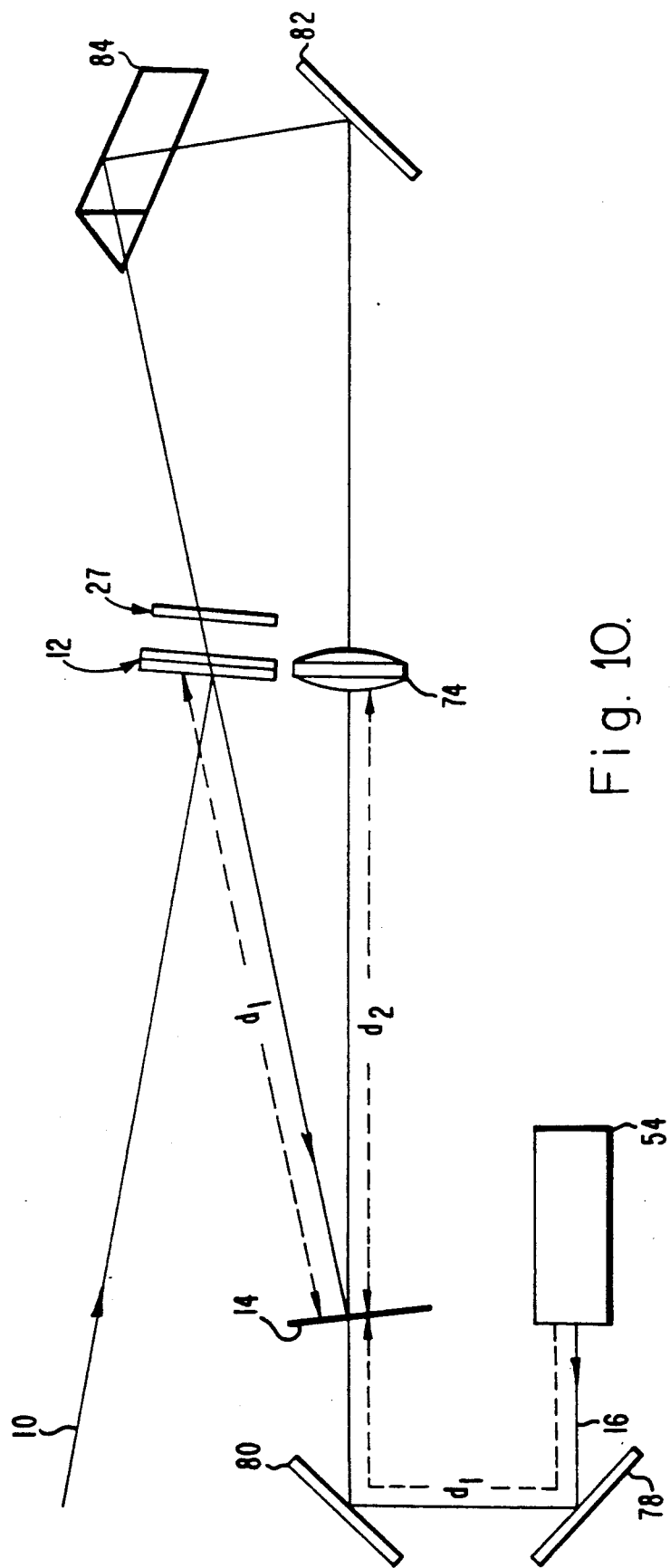
FIG. 10 is a schematic diagram of an optical imaging relay system for use with the present liquid crystal light valve adaptive optics system.

In some instances the diffractive spreading effects associated with the relay path from front side to back side of the LCLV can exceed the required element size. For such cases, diffractive spreading can be minimized by imaging relay optics as illustrated in FIG. 10. Care must be taken to ensure that either the phase of the input remote reference image being relayed is accurately transferred to the interference plane, proximal to the photoconductor or preamplifier, or that the local reference and remote reference experience matching path aberrations.

Figure 11B:
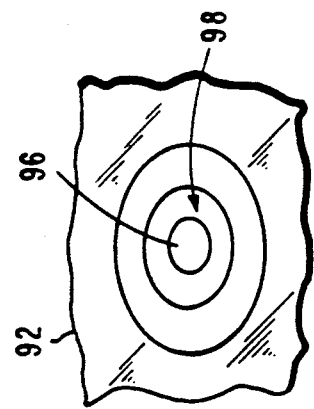
FIG. 11(b) shows in detail an exploded perspective of a spatial filter component of the relay system shown in FIG. 11(a).

Conventional imaging relay optics systems may not be suited for optimal use in the present invention, since the wavefront phase is usually not accurately replicated by such systems. It is important for the optimum functioning of the present invention that the phase information be accurately replicated. Two alternative embodiments of optical relay systems for achieving this are discussed below and shown in FIGS. 10 and 11.

As shown in FIG. 10, a lens 74 is used to relay the phase image of the remote reference wavefront 10 from the front of the LCLV 12 to the back side. To compensate for the aberrations introduced by such a conventional lens imaging element, a matching aberration is introduced in the path of the local reference wavefront 16. This matching aberration is introduced by injecting the local reference wavefront 16 at the same distance from and on the same side of lens 74 as the reflected remote reference. Thus, both the reflected remote 10 and local 16 reference wavefronts undergo identical aberrations, and the effect of these aberrations cancel each other when the two wavefronts are combined in an interferometer. Similarly, phase aberrations caused by lens imperfections and focussing errors will also cancel out. If the remote reference 10 signal is weak, as is typically the case in adaptive optics applications, the reflectivity of beam splitter 14 should be high, on the order of 90%, to prevent serious degradation of the signal-to-noise ratio.

As shown in FIG. 10, the aberrated remote reference beam 10 which is incident on the front side of the LCLV 12, is reflected towards beam splitter 14 positioned at a distance $d_l$ from LCLV 12. The local reference beam 16 from a local reference laser 54 is reflected by mirrors 78 and 80 and thereafter is transmitted by beam splitter 14. The beam splitter 14 is positioned at a distance $d_2$ from lens 74, and the local reference beam 16 traverses a distance $d_l$ from the source 54 to beam splitter 14. After transmission through beam splitter 14, local reference beam 16 interferes with the reflected remote reference beam 10 and covers the same distance $d_2$ to lens 74 from the same side of lens 74 as the beam 10. "$d_1 + d_2$" is adjusted to be equal to '2f', where f is the focal length of lens 74. The interference pattern created by the two interfering beams 10 and 16 is transmitted through lens 74, reflected by mirror 82, inverted by roof prism 84 and passed through a preamplifier 27 before being input to the back side of LCLV 12. The distance covered by the beams in being relayed from lens 74 to the back side of LCLV is also adjusted to be exactly equal to twice the focal length, f, of the lens 74. Thus, lens 74 is positioned such that it is spaced apart from the front and back sides of the LCLV 12 by a distance equal to twice the focal length, f, of the lens 74. Thus, lens 74 will function as a conventional 1:1 imaging element causing image inversion. Therefore, additional inversion elements will have to be used to invert the inverted image and satisfy the registration requirements, as further discussed below.

The optical relay system discussed above and shown in FIG. 10 is an arrangement which meets the frequency and spatial registration, and fidelity requirements of adaptive optics applications for which the present invention is suitable. For example, the roof prism 84 used in conjunction with the other elements of the relay system ensures that there will be no image inversion of the image being relayed to the back side of LCLV 12. The individual optical elements used in the relay system of FIG. 10 are standard, commercially-available elements. However, the arrangement and positioning of these elements have to meet the various rigorous optical requirements, of the present invention, and these requirements are not met by the typical conventional discrete channel adaptive optics system.

Figure 11A:
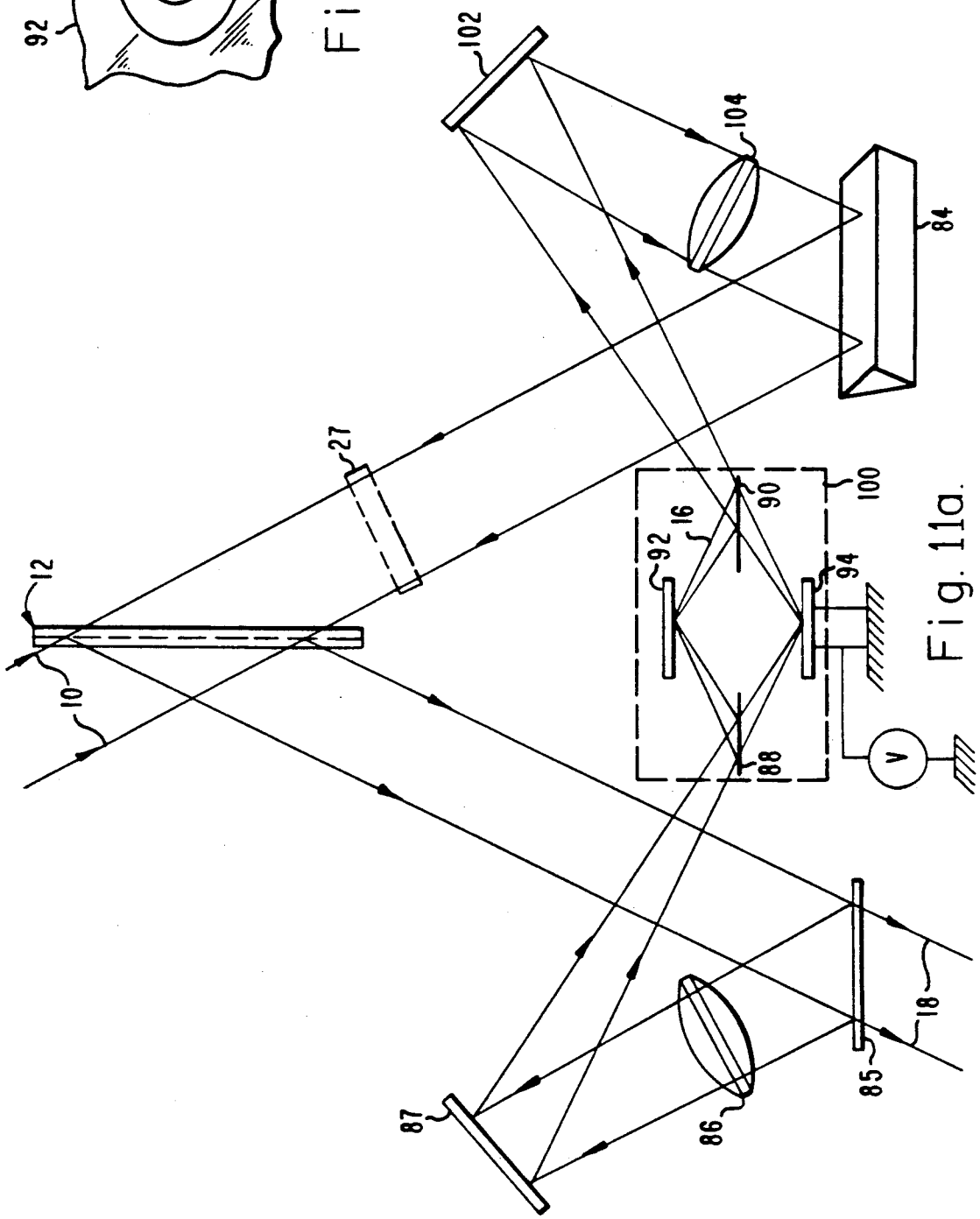
FIG. 11(a) is a schematic diagram of another optical imaging relay system for use with the liquid crystal light valve adaptive optics system of the present invention. This relay system uses a dual-path, matched-path interferometer.

The relay approach described above is practical only for cases where the local reference 16 is strong and highly coherent with the remote reference 10. If the remote reference 10 is reasonably monochromatic, the required coherent local reference can be obtained by phase-locking the local laser oscillator and the remote reference laser oscillator frequencies as described earlier in connection with the phase-locked-loop system 56 of FIG. 8. However, in cases where the remote reference beam is white-light or is broad-band laser radiation, instead of being monochromatic, the phase-locking approach will not be suitable. In this case, dual-path, matched-path interferometers with a spatial filter in one arm of the interferometer will have to be used. As shown in FIG. 11(a), the aberrated remote reference beam 10 is incident on the front side of the LCLV 12. It is reflected in turn by the LCLV, and dichroic beam splitter 85, and is then transmitted through transforms lens 86, and reflected by mirror 87 on to beamsplitter 88 which forms part of a matched path interferometer 100. The other components of interferometer 100 are another beamsplitter 90, and mirrors 92 and 94. Mirror 94 is controlled by a PZT translator for phase control and path balancing. The PZT translator is actuated in response to an applied voltage V. The mirror 92 incorporates a spatial filter, thereon. The mirror and spatial filter 92 is shown in greater detail in FIG. 11(b). Mirror 92 is a reflection mirror whose reflectivity is adjusted such that it passes only that portion of the beam which is incident on the central elliptical 'bright' portion 96, whereas the rest of the beam is absorbed by the surrounding area 98. The size of portion 96 should correspond to the diffraction-limited spot size of remote reference beam 10. Conventionally-used techniques such as evaporation of an absorbing material onto the surface of a mirror, or roughening the surface of a mirror using photolithographic etching, can be used to form the spatial filter on the mirror.

This alternative embodiment varies from the previously discussed embodiments in that the local reference beam 16 is derived not from a separate laser source, but instead is derived from the remote reference 10 by spatial filtering. As shown in FIG. 11(a), reflected remote reference beam 10, is split by beamsplitter 88 into two beams which then follow the two matched paths of the interferometer. The beam reflected and spatially filtered by mirror 92 acts as the local reference 16; the other beam is reflected by mirror 94 and then interferes at beamsplitter 90 with beam 16 to create an interference pattern. This interference pattern is reflected by mirror 102, transmitted by transform lens 104, has the image inversion corrected by roof prism 84 and after passing through preamplifier 27, is input to the back side of LCLV 12. The conjugation action which takes place thereafter is similar to that discussed earlier in connection with the FIG. 1 embodiment. The resulting corrected output wavefront 18 emerges through dichroic beamsplitter 85. The role of roof prism 84 in inverting the image inversion was discussed in connection with FIG. 10 and will not be repeated here. Transform lenses 86 and 104 are standard lens components and are used herein to achieve fourier transform imaging.

Summarizing, the alternative embodiment discussed above and shown in FIGS. 11(a) and 11(b) utilizes an optical imaging relay system using transform lenses to achieve Fourier transform imaging, and a local reference obtained by spatially filtering a portion of the aberrated reflected remote reference beam 10, in accordance with the principles of the present invention.

Figure 11C:
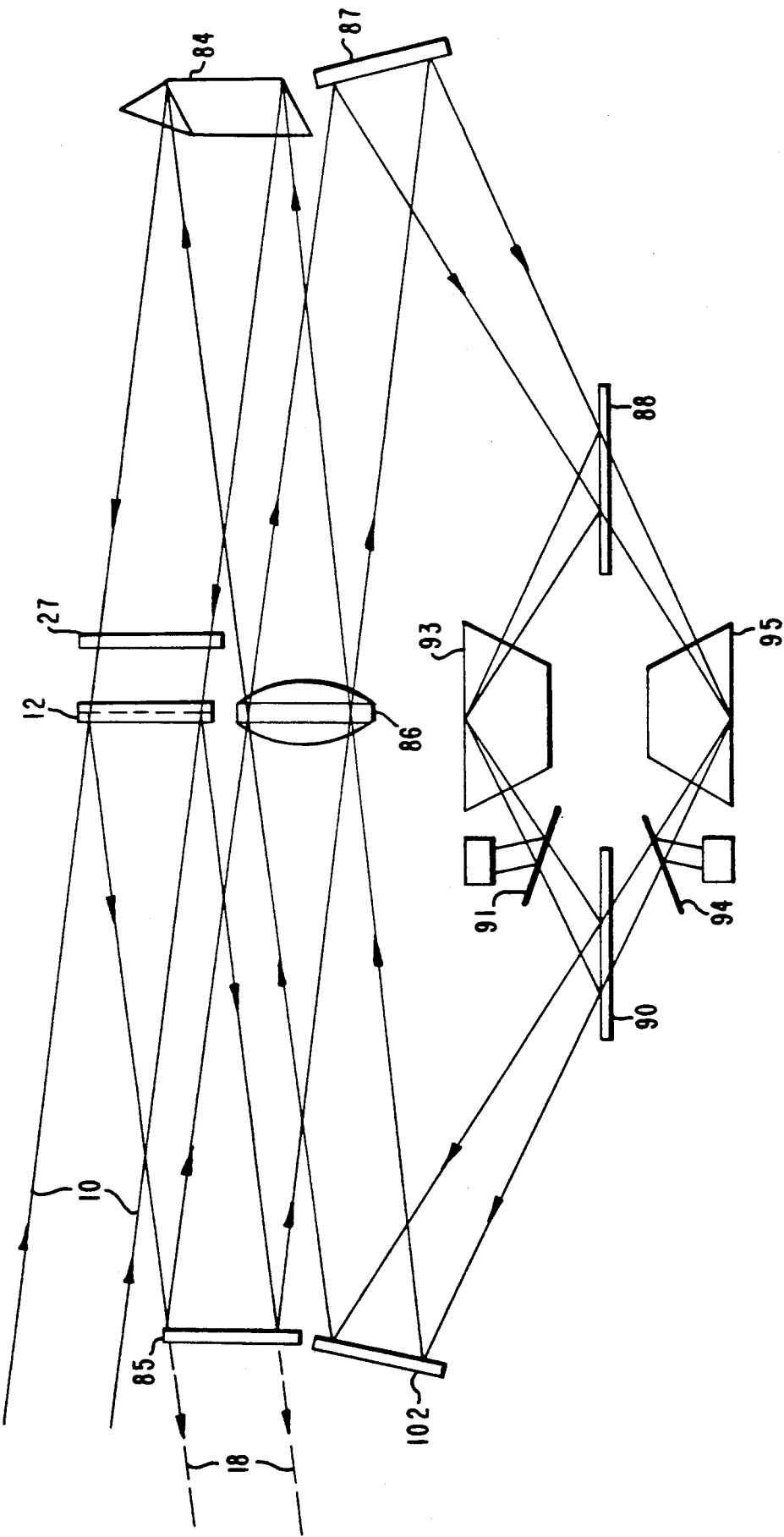
FIG. 11(c) is a modified version of the optical imaging relay system of FIG. 11(a).

A modified version of the optical imaging relay system of FIG. 11(a) is shown in FIG. 11(c). The embodiment depicted in FIG. 11(c) differs from that of FIG. 11(a) in that only a single transform lens is used in the relay system. The matched-path, dual-path interferometer comprises two beamsplitters 88 and 90; two mirrors 91 and 94, each mirror being controlled by a PZT translator for phase controlled and path balancing; and two total internal reflection components 93 and 95, one of which has a spatial filter incorporated therein. This embodiments functions, in most respects, in a manner similar to that of the FIG. 11(a) embodiment.

The matched-path interferometer embodiments discussed above are suitable for wavefront correction in white light or broad-band laser radiation for which the phase-locked-loop approach is not ideally suited. In the case where the remote reference 10 is white light, matching of the two paths of the interferometer is very critical and the paths should be matched within approximately a quarter of the wavelength of the incident light. In the case of broad-band laser radiation, the matching requirement is less stringent than the requirement for white light, but is still critical.

One operational mode for the various embodiments discussed thus far is a 'conjugation' mode. In this operational mode, the remote reference beam is predistorted in a time-reversed phase conjugate sense by reflecting it using LCLV 12, after the liquid crystal layer 20 has been suitably acted-upon by negative feedback and is in steady-state equilibrium. This predistorted beam then retraverses the atmospheric and other system aberrations and arrives at the receiving site with its aberrations corrected.

The present invention is also operable in another alternative mode as a "wavefront scrubber". In this mode of operation, the invention can be used to eliminate aberrations in multiple contiguous laser beams from multiple laser sources, for example discrete diode lasers. These multiple laser sources are locked in frequency using known techniques such as injection locking of laser oscillators, common feed oscillator in master-oscillator-power-amplifier (MOPA) chains, nonlinear four-wave mixing or waveguide cross-coupling via evanescent modes. However, these known techniques of frequency locking cannot achieve the desired degree of phase alignment between the multiple laser beams. However, the LCLV system shown in FIG. 12 can achieve the phase alignment necessary for achieving the aberration-correction discussed earlier.

Figure 12:
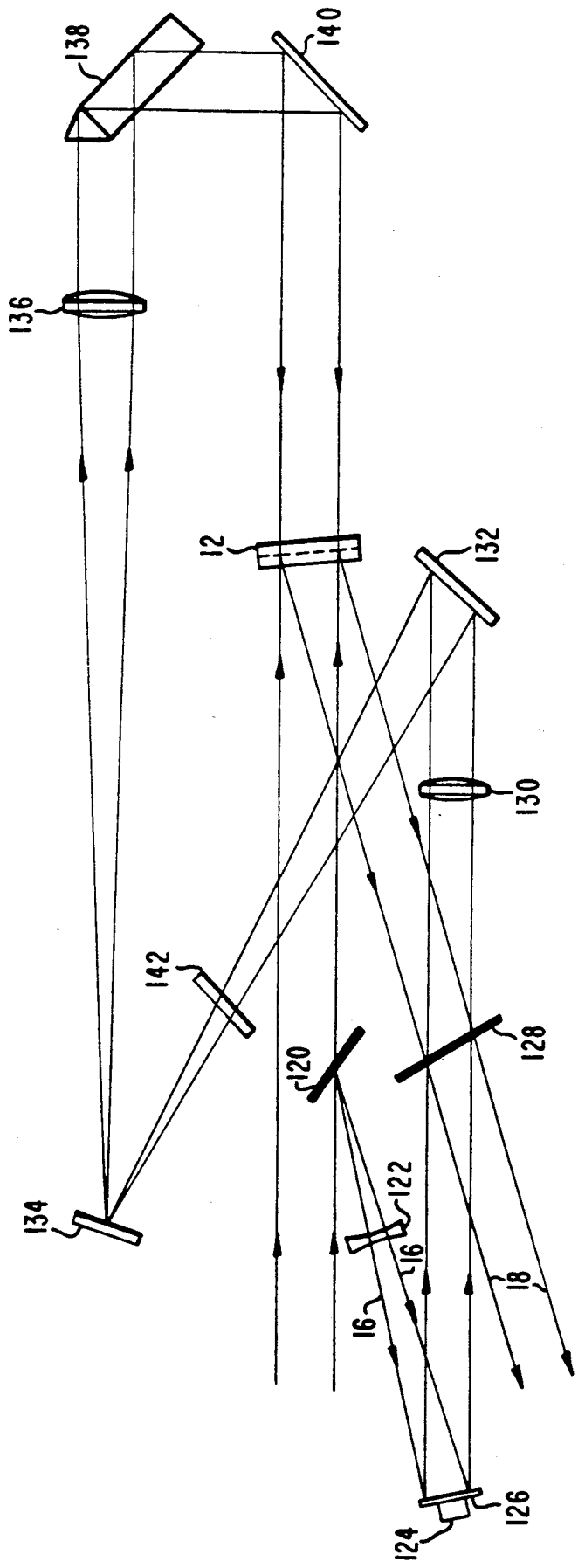
FIG. 12 is a schematic diagram of an alternative embodiment of the present invention for use in a wavefront scrubber operational mode.

As shown in FIG. 12, the local reference wavefront 16 is a sample portion extracted from a relatively plane portion of the input, aberrated wavefront 10, by a mirror 120. The sample extracted portion can be from a single laser-oscillator or amplifier ih a MOPA laser system. This sample portion is expanded by expansion lens 122 and recollimated by mirror 126 so that the appropriate interference pattern 17 can be produced on the back-side of the LCLV 12. The recollimation mirror 126 can be driven by a PZT actuator 124. After collimation by mirror 126, the local reference 16 passes through beam splitter 128, and a diffraction-limited transform lens 130, is reflected by mirrors 132 and 134, passes through another transform lens 136, prism 138 and is reflected by mirror 140 onto the back side of the LCLV 12. For optimum performance, the splitter ratio of beamsplitter 128 is selected so as to give a fringe contrast of unity in the interference pattern 17. Typically, the beamsplitter 128 should have a high transmissivity and low reflectivity. For example, if 25 discrete laser beams are being brought into phase alignment, the desired relectivity would be on the order of about 4%, and a glass plate with an antireflection coating on one side can be used. Unless the laser sources are unusually weak, a neutral-density filter or alternator 142 should be used as required to lower the irradiation on the back side of the LCLV 12 to normal operating levels on the order of 30 to 40 $\mu$watts/cm$^2$. Optionally, a spatial filter deposited on mirror 134, or, a pinhole located slightly beyond it with shifted local lengths, can be used to reduce the registration requirements of this optical relay system.

An alternative operational mode of the present invention as a 'wavefront replicator' is shown in FIG. 13 and discussed below. The aberrations of the incoming remote reference beam 10 are accurately replicated in another independent beam 180 from source 182 by the wavefront replicator. Beam 180 is typically a more intense beam than the remote reference 10. In contrast to the wavefront conjugation and scrubber modes wherein the output wavefront is aberration-free, in the wavefront replicator mode of operation, the present invention provides an aberrated output wavefront in which the aberrations of the input wavefront are accurately replicated.

As a wavefront replicator, the present invention is ideally suited for nonlinear optical conjugation applications requiring amplification of a weak, aberrated remote reference signal. In practice, conventional laser amplifiers are unsatisfactory for this purpose since the input remote reference beam 10 is generally not strong enough to extract sufficient energy from the amplifier in the presence of laser amplifier spontaneous emission. Therefore, the desired degree of amplification, on the order of $10^5$, generally cannot be achieved with conventional laser amplifiers. Furthermore the high gains typically required for the applications being discussed herein will make conventional laser amplifiers unstable and generate excessive noise. Also, conjugation processes such as stimulated Brillouin scattering typically require input beams having energies exceeding some threshold energy level, for example, one millijoule per pulse. Therefore, satisfactory conjugation may not be achieved when the input pulse is weak, for example, on the order of one microwatt. Referring to FIG. 13, if the remote reference 10 passes directly through a conventional laser amplifier 152 and is conjugated by a nonlinear optical conjugator, for example a stimulated Brillouin conjugator, it would be sufficiently amplified only if its energy is high enough to begin with, on the order of a millijoule.

For a weak remote reference 10, a preamplifier may be required to overcome the drawback mentioned above. However, the preamplifier will generally be unable to satisfy the multiple requirements of high sensitivity, high stability, and high gain on the order of $10^5$ and be able to achieve accurate wavefront replication without degrading the signal-to-noise ratio. The present invention meets all these requirements by providing an optical LCLV preamplifier.

One presently-preferred wavefront replicator embodiment is shown in FIG. 13. Block 160 is basically a frequency tracking PLL unit used to maintain the local laser 54 frequency at that of the remote reference. Block 160 corresponds to block 56 of FIG. 7. Since the details of block 56 were shown in FIG. 8 and discussed earlier, they will not be repeated here. Aberrated remote reference 10, having a wavelength $\lambda_1$ is split by dichroic beamsplitter 162, and a sample portion of the remote reference 10 is reflected by the mirror 164. This sample is further acted upon by the PLL unit 160 and then the local reference beam 16 is combined at dichroic beamsplitter 165 with independent laser beam 180 having a wavelength $\lambda_2$. The beams 16 and 180 follow parallel paths and are incident on the front side of LCLV 12, are reflected by the LCLV 12, and then by mirror 166. The reflected beam 184 is split by dichroic beam splitter 168, and the split beam having wavelength $\lambda_1$, is relayed through mirror 170, bandpass filter 172, and preamplifier 27, and is incident on the rear side of LCLV 12. The filter 172 is selected to have a passband of $\Delta\lambda$. The split beam having a wavelength $\lambda_2$ is relayed through a conventional polarization-selecting splitter 158 or other suitable optical components to laser amplifier 152 and then, in conjugation applications, through quarterwave plate 152 to a nonlinear optical conjugator 156. The amplified beam 190, at wave length $\lambda_2$ is then output by the nonlinear conjugator 156, quarter wave plate 154 and double-pass, laser amplifier 152 system illustrated in FIG. 13. In the output beam 190, both atmosphere-induced and amplifier-induced aberrations are compensated-for and corrected by the phase conjugation process.

Summarizing, in the wavefront replication mode of operation, the present invention replicates in another beam 180, the aberrations in the remote reference 10. The remote reference 10 has a wavelength $\lambda_1$ and is typically a weak, continuous-wave beam having energies less than about one microwatt. The beam 180 is preferably a pulsed beam, having a wavelength $\lambda_2$ and higher intensity than the remote reference 10. The wavelength separation between $\lambda_1$ and $\lambda_2$ would typically be about 20%. The aberrations in the remote reference 10 are replicated in the refractive index variations produced in the liquid crystal layer 20 of LCLV 12. These refractive index variations proportionately modulate the local reference laser beam 16 (having a wavelength $\lambda_2$, approximately) when it is incident on the front side of LCLV 12. Beam 180 follows a path parallel to beam 16 and is reflected in parallel from the front side of LCLV 12. Thus, both beams 180 and 16 are modulated to the same extent, and both 'readout' the aberrations of the remote reference 10. The modulated reflected beam 180, having the same aberration as remote reference 10 but at a higher intensity, is provided as input to the conventional double-pass, laser amplifier-nonlinear phase conjugator system. Thus, the present invention utilizes the large spatial bandwidth handling capability and high resolution offered by the LCLV 12 to provide a high-gain coherent wavefront replicator and optical preamplifier with a high signal-to-noise ratio.

In an alternative wavefront replicator embodiment, the beam exiting from the conjugator 156-laser amplifier 152 combination is reflected and conjugated by a second LCLV, which is substituted in place of the nonlinear optical conjugator. This embodiment suffers from the drawback that the second LCLV will typically be subjected to an unacceptable level of power loading.

Although the present invention has been described in detail with reference to a particular preferred embodiment, persons possessing ordinary skill in the art to which this invention pertains will appreciate that various modifications may be made without departing from the spirit and scope of the invention.

What is claimed is:

1. A method of processing a laser beam using a liquid crystal light valve, including the steps of:
    sensing a first aberrated remote reference beam by:
        (a) passing said aberrated reference beam through a changeably refractive medium; and
        (b) reflecting said aberrated remote reference beam from a reflective layer which is substantially adjacent to said medium;
    feeding back said remote reference beam to adapt the liquid crystal light valve with a map of the aberrations in said remote reference beam by:
        (c) directing a first portion of the aberrated reflected beam toward a photosensitive region substantially adjacent to said reflective layer;
        (d) applying a suitable voltage across said medium and said photosensitive region; and
        (e) combining said first portion of the aberrated reflected beam with a local plane wave reference so as to form an interference pattern on said photosensitive region, thereby generating commensurate index changes in said changeably refractive medium responsively to the interference pattern, wherein said local plane wave reference tracks the remote reference beam in frequency and phase, and said interference pattern is in spatial registration with the remote reference beam, and
    processing the laser beam with the adapted liquid crystal light valve so as to generate timereversed, phase conjugate aberrations in said laser beam responsively to the map of aberrations.

2. The method of claim 1 wherein said local plane wave reference is derived from said remote reference by spatial filtering.

3. The method of claim 2 wherein the spatial filtering is accomplished in a matched-path, dual-path interferometer means.

4. A wavefront replicator comprising:
spatial light modulator means for sensing an aberrated remote reference beam and for being adaptively modified in response thereto; and
frequency tracking and phase locking means for locking the frequency and phase of a local reference with the phase and frequency of the aberrated remote reference,
the adaptively modified spatial light modulator means modulating said local reference and a beam with intensity higher than said remote reference such that the aberrations of the aberrated remote reference beam are replicated in said beam.

5. The system of claim 4 further including a nonlinear optical conjugator and laser amplifier for compensation of the aberrations replicated in said beam.

6. The system of claim 4 wherein said frequency tracking and phase locking means comprises:
at least one acousto-optic modulator for shifting the frequency of said local reference to track said remote reference by an amount determined by the frequency difference between said references;
a heterodyne detector for determining the frequency difference between said local and remote references and providing a signal representative of the difference; and
means for driving said acousto-optic modulator in response to said signal so as to shift the frequency of said local reference by said amount.

7. The system of claim 6 wherein said means for driving includes:
a local oscillator source tuned to an intermediate frequency;
an amplifier means for combining the output of said local oscillator source and said signal from said heterodyne detector; and
a voltage controlled oscillator driven by the combined output provided by said amplifier means, said voltage-controlled oscillator being operatively linked to said acousto-optic modulator.

8. The system of claim 7, further including a second acousto-optic modulator for shifting the local reference frequency to remove the intermediate frequency offset introduced by said local oscillator source, so that said local reference tracks the remote reference despite phase and frequency shifts which are not common to said oscillators.

* * * * *